(12) United States Patent
Massmann et al.

(10) Patent No.: US 8,240,440 B2
(45) Date of Patent: Aug. 14, 2012

(54) DEVICE FOR LIFTING A HATCH PIVOTABLE AROUND A PIVOT AXIS

(75) Inventors: Rainer Massmann, Bonn (DE); Rolf Mintgen, Thuer (DE); Kathrin Peifer, Mittelstrimmig (DE); Moritz Starkmeth, Koblenz (DE); Udo Wendland, Koblenz (DE)

(73) Assignee: Stabilus GmbH, Koblenz (DE)

( * ) Notice: Subject to any disclaimer, the term of this patent is extended or adjusted under 35 U.S.C. 154(b) by 954 days.

(21) Appl. No.: 11/803,221

(22) Filed: May 14, 2007

(65) Prior Publication Data

US 2007/0267258 A1    Nov. 22, 2007

(30) Foreign Application Priority Data

May 18, 2006    (DE) .......................... 10 2006 023 315

(51) Int. Cl.
*F16F 9/34* (2006.01)

(52) U.S. Cl. ........... 188/322.15; 188/266.2; 188/322.16; 188/317

(58) Field of Classification Search ............... 267/64.12, 267/120, 124, 64.11; 188/266.2–266.5, 283, 188/300, 317, 322.13, 322.15, 322.16–322.18
See application file for complete search history.

(56) References Cited

U.S. PATENT DOCUMENTS

| | | | | |
|---|---|---|---|---|
| 5,069,420 A | * | 12/1991 | Stobbs et al. | ............... 251/30.02 |
| 5,437,354 A | * | 8/1995 | Smith | ........................ 188/266.1 |
| 5,468,042 A | | 11/1995 | Heinrichs et al. | |
| 5,749,596 A | * | 5/1998 | Jensen et al. | ........... 280/124.166 |
| 5,839,719 A | * | 11/1998 | Hosan et al. | ................ 267/64.12 |
| 6,179,100 B1 | | 1/2001 | Mintgen et al. | |
| 6,719,356 B2 | * | 4/2004 | Cleland et al. | ............. 296/146.8 |
| 2005/0168010 A1 | | 8/2005 | Cleland et al. | |
| 2005/0229593 A1 | | 10/2005 | Matsumoto et al. | |

FOREIGN PATENT DOCUMENTS

| | | |
|---|---|---|
| CN | 2104477 | 5/1992 |
| CN | 2382895 | 6/2000 |
| DE | 41 19 579 | 12/1992 |
| DE | 42 24 132 | 1/2004 |
| DE | 20 2004 010 888 | 10/2004 |
| DE | 10 2005 012 339 | 10/2005 |
| DE | 10 2005 019 577 | 11/2006 |
| JP | 11117976 | 4/1999 |
| JP | 2006027549 | 2/2006 |

OTHER PUBLICATIONS

German Office Action dated Jan. 16, 2007 issued for the corresponding German Application No. 10 2006 023 315.8.

* cited by examiner

*Primary Examiner* — Robert A Siconolfi
*Assistant Examiner* — Anna Momper
(74) *Attorney, Agent, or Firm* — Cozen O'Connor

(57) ABSTRACT

Apparatus for lifting a hatch which can pivot around a pivot axis, especially a hatch of a motor vehicle, by means of a piston-cylinder unit. The piston-cylinder unit has a closed cylinder filled with a pressurized fluid, the interior of the cylinder 6 being divided by a piston into a first working chamber and a second working chamber. A piston rod passes through the second working chamber and is guided to the outside through a seal at the end of the cylinder and then hinged to the hatch, whereas the other end of the cylinder is hinged to a stationary component. A through-opening leading from the first working chamber to the second working chamber, is provided in the piston. The through-opening can be opened by an electrically actuated valve.

9 Claims, 12 Drawing Sheets

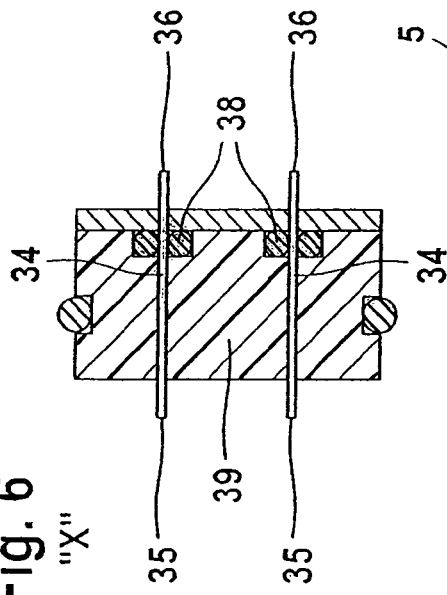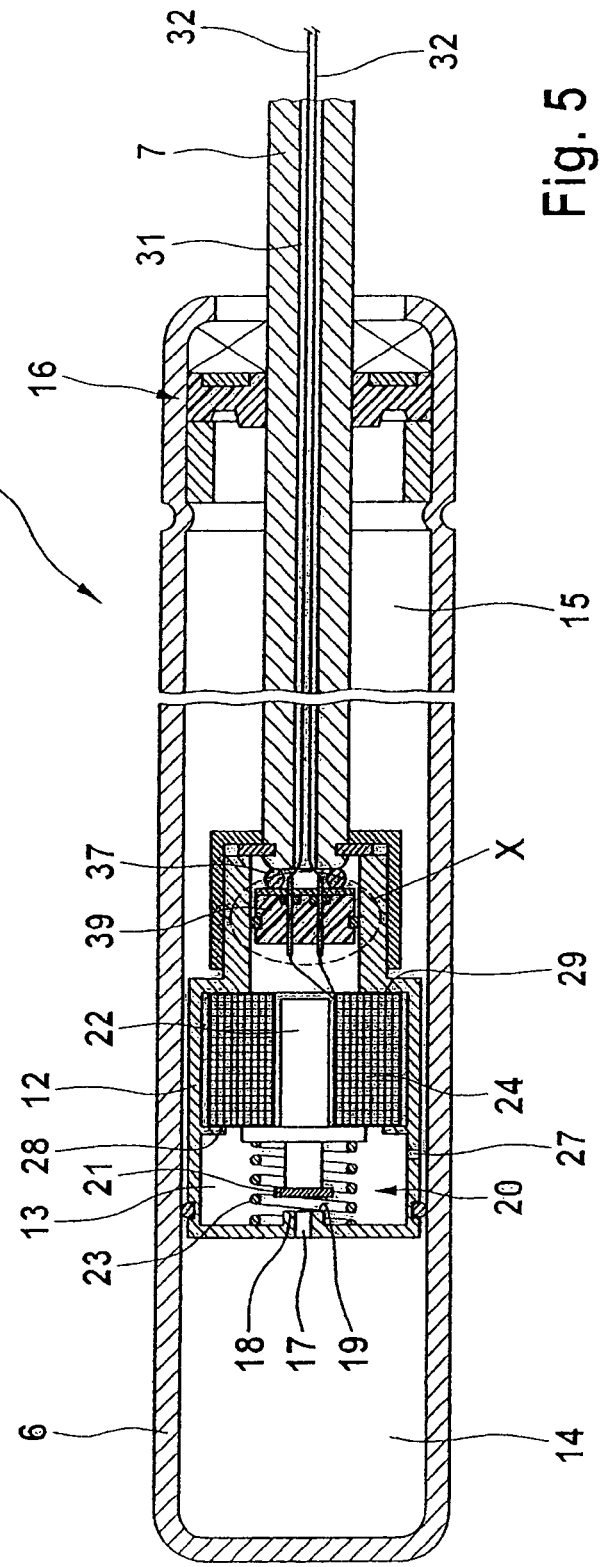

DEVICE FOR LIFTING A HATCH PIVOTABLE AROUND A PIVOT AXIS

BACKGROUND OF THE INVENTION

1. Field of the Invention

The invention pertains to a device for lifting a hatch which can pivot around a pivot axis, especially a hatch of a motor vehicle, by means of a piston-cylinder unit, where the piston-cylinder unit has a closed cylinder filled with a pressurized fluid, the interior of the cylinder being divided by a piston into a first and a second working chamber, the piston being free to move axially back and forth in the cylinder. A piston rod is being attached to one side of the piston, the rod passing through the second working chamber and being guided to the outside through a seal at the end of the cylinder and then hinged to the hatch or a stationary component, whereas the other end of the cylinder is hinged to the stationary component or to the hatch, where a through-opening, which can be opened and/or closed, leading from the first working chamber to the second working chamber, is provided in the piston.

2. Description of the Related Art

In devices of this type it is known that an actuating plunger extending through the piston rod to the outside can be used to open and to close the through-opening manually.

This always means, however, that the actuating person must be present in the area of the hatch and must, in each individual case, decide to actuate the device and then actuate it.

SUMMARY OF THE INVENTION

An object of the invention is to provide a device of the type indicated above which is simple in design and which makes it possible for the hatch to be raised and held in any desired open position as a function of various conditions.

According to the invention in that the through-opening can be opened and/or closed by an electrically actuated valve.

This design makes it possible for the through-opening leading from the first working chamber to the second working chamber to be opened and/or closed on the basis of a wide variety of conditions. These can be individually defined conditions or standard, general conditions.

The valve can be a valve which opens completely when actuated or a proportional valve.

The piston-cylinder unit is preferably a gas spring.

The electrically actuated valve can be slide valve or a seat valve.

So that an electric drive is required for only one direction of movement and can thus be implemented at low cost, the closing element of the electrically controlled valve can be actuated in the opening direction in opposition to the force of a spring.

In the same way, however, the closing element of the electrically controlled valve can be actuated in the closing direction in opposition to the force of a spring. Thus the force which drives the closing element in the direction opposite to that in which the electric drive works is easily provided by the spring.

The electrically actuated valve is a solenoid-operated valve may be a solenoid-operated valve. Of course, the valve can be provided with some other means for moving the closing element. Thus, for example, the closing element can be shifted by a spindle, which can be turned by an electric motor.

A space-saving design can be obtained by providing the solenoid-operated valve with a ferromagnetic core, which is movably supported in a piston chamber in the piston. This magnetic core can act on a closing element of the electrically actuated valve in opposition to the force of a spring.

For this purpose, the area of the magnetic core is preferably surrounded by a coil, extending in the axial direction with respect to the path of movement of the magnetic core.

One possibility for the location of the coil is for the coil to be mounted on the cylinder or in the wall of the cylinder and to have it extend along the path of movement of the piston in the cylinder. This offers the advantage that there do not have to be any power lines connected to the stationary coil which would have to be able to move along with the piston and the piston rod.

To prevent a shielding effect on the magnetic field generated by the coil, the coil can be wound inside a tube of nonmagnetic material or around the outer lateral surface of the tube, where the tube is inserted coaxially into the cylinder, and where the piston is located in the through-opening of the tube with freedom to move therein.

Another possibility is that the coil could be wound around the outer lateral surface of the cylinder consisting of nonmagnetic material. Because the cylinder is made of nonmagnetic material, it does not produce any shielding effect.

The tube and/or the cylinder can be made of aluminum or of stainless steel or of plastic.

Another possibility for the location of the coil is for the coil to be arranged in the piston and to extend along the path of movement of the magnetic core.

The coil in this case is preferably connected tightly to the piston. This can be done easily by tightly bonding the coil to the piston by means of a plastic sealing compound.

To protect the coil, it can be tightly embedded in a plastic sealing compound.

To avoid a connection between the coil and the second working chamber, the coil can form a coil block, which is sealed off tightly against the piston by a sealing element.

For this purpose, the sealing element can be a simple sealing ring, which radially surrounds the coil block. The inside circumference of the ring rests with a sealing action against the inside wall of the piston chamber, which is formed in the piston to hold the coil block.

To supply the coil with current, the power lines can be guided to the outside through a coaxial opening in the piston rod, the piston rod being sealed off against the piston chamber.

One way of sealing off the piston rod against the piston chamber is to provide the power lines with a seal of plastic material which has been injection-molded around them. This seal rests with a sealing action against the piston rod in the terminal orifice area of the coaxial opening leading to the piston chamber.

Another way in which the piston rod can be sealed off against the piston chamber is to insert a sealing body tightly into the piston chamber between the orifice of the coaxial opening leading into the piston chamber and the area of the coil. This sealing body has pass-through contacts projecting axially outward from both sides. One end of each of these contacts is connected in an electrically conductive manner to the coil, while the other end is connected to a power line.

The sealing body can easily rest with a sealing action against the piston rod in the terminal orifice area of the coaxial opening leading into the piston chamber.

The pass-through contacts can project through pass-through openings extending axially through the sealing body and be sealed off against the walls of the pass-through openings by sealing rings, which surround the pass-through contacts.

Another possibility is to design the sealing body as a glass sealing body, in which the pass-through contacts are embedded.

To seal off the piston rod against the piston chamber, the area between the orifice of the coaxial opening leading to the piston chamber and the coil or the coaxial opening can be partially or completely filled with a plastic sealing compound, through which the power lines are conducted.

To simplify installation, the power lines are preferably flexible power lines, where the flexible power lines can be cables or ribbon conductors.

Depending on where the power lines extending out from the piston rod are to go after they leave the rod, the coaxial opening at the end of the piston rod which projects from the cylinder can open to the outside either coaxially or radially with respect to the orientation of the piston rod, and the power lines will then pass to the outside through this opening.

To simplify installation in this case, contact plugs are preferably mounted on the ends of the power lines extending out from the opening.

Instead of guiding both power lines through the piston rod, it is also possible to guide one of the power lines through the piston rod and the other power line along the inside wall of the cylinder, where it is contacted by a slide contact, which is mounted on the piston and is in contact with the coil.

The number of separate components can be reduced and their design simplified by forming the cylinder out of electrically conductive material and using that as one of the power lines.

The number of separate components can again be reduced and their design simplified by forming the piston rod out an electrically conductive material, which is in contact with the coil, and using that as one of the power lines.

The closing element is preferably permanently connected to the magnetic piston.

To achieve a piston of compact design, the through-opening can have a valve passage which leads axially from the first working chamber to the piston chamber and which can be closed by the closing element, and the piston chamber can be connected to the second working chamber.

To ensure that the valve passage can be closed reliably, the valve passage is preferably formed in a part designed in the form of a pipe socket, which projects into the piston chamber, where the orifice area of the valve passage leading into the piston chamber forms the valve seat of the seat valve.

So that the hatch can be opened manually even if there is a defect in the closed valve or a power failure, a check valve pretensioned in the closing direction is preferably installed in the piston. This valve can be used to open a connection from the second working chamber to the first working chamber.

If an axial groove or several axial grooves a certain distance apart which extend over certain sections of the length of the cylinder are provided in the inside wall of the cylinder, these axial grooves act as a bypass and define areas in which the gas spring can travel freely outward. This is useful when there is a certain range of opening angles within which the hatch should not be held steady. An opening angle range of this type can be present, for example, at the beginning of the opening process, when the user is still in the area of the hatch.

Preferably, therefore, an axial groove can be formed in the end area of the cylinder facing away from the piston rod and/or at the end where the piston rod is present.

The valve can be actuated by a control unit as a function of data which are permanently stored in the control unit or as a function of variable input data.

One possibility of generating variable input data is to install an obstacle detection sensor for monitoring the area in the immediate vicinity of the hatch, especially the pivot area of the hatch. The detection signal generated by the obstacle detection sensor can be transmitted to a control unit. An obstacle detection sensor can be a camera or a contact sensor or a proximity sensor, where design options for the proximity sensor include radar sensors and capacitive sensors.

Other variable input data can be meteorological data such as temperature data and/or rain data and/or snow data and/or wind data detected by sensors.

Other variable input data can be data on the state of the vehicle such as the angle of the vehicle to the horizontal and/or vehicle motion data.

Variable data input can also be data on the degree to which the hatch has been opened.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 5 shows a cross section of a fourth exemplary embodiment of a gas spring for a device for lifting a hatch;

FIG. 6 shows an enlarged view of the part of FIG. 5 marked "X";

DETAILED DESCRIPTION OF THE PRESENTLY PREFERRED EMBODIMENTS

Figure 1:
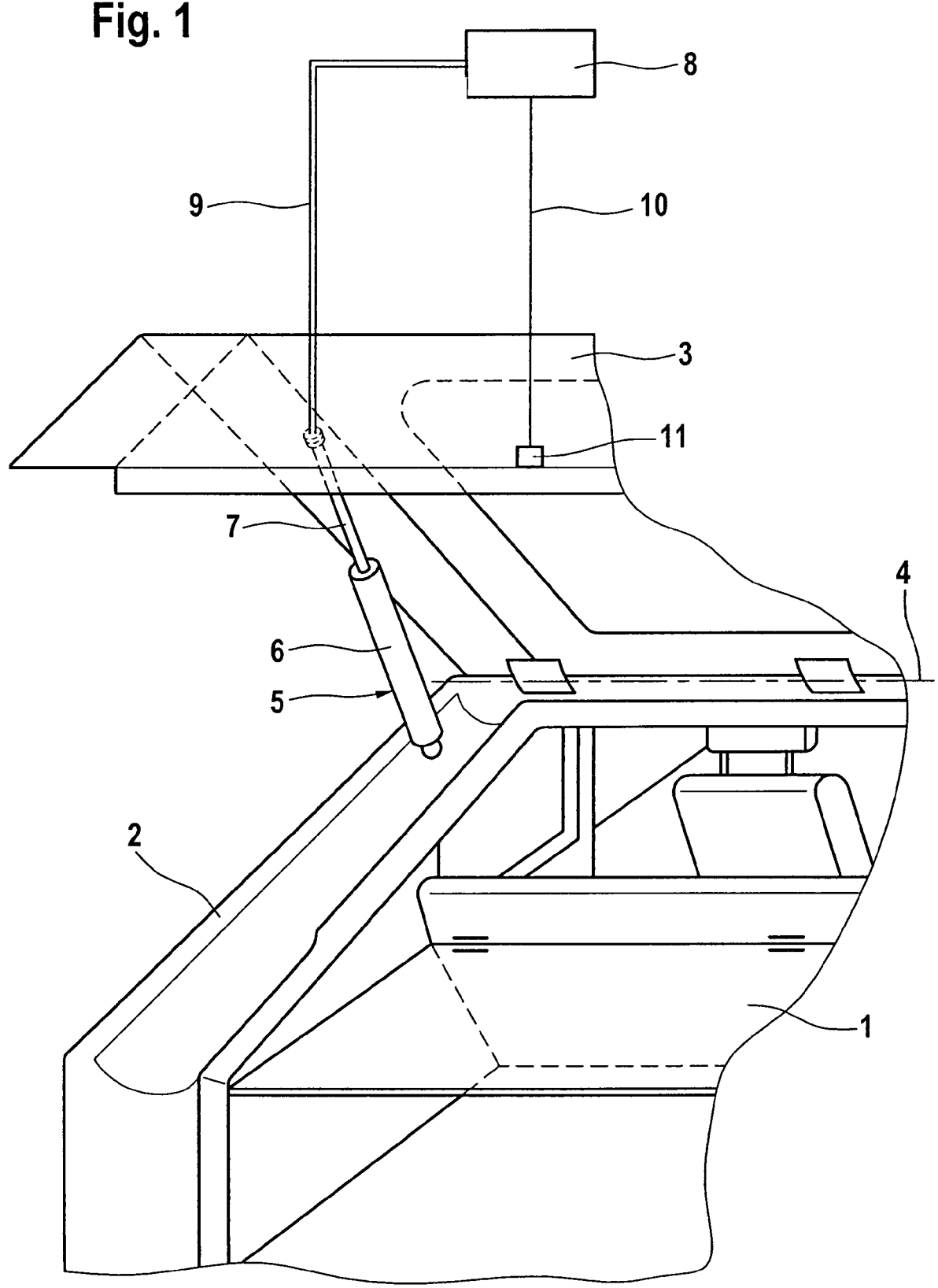
FIG. 1 shows a perspective view of a part of the hatch area of a motor vehicle with a device for lifting the hatch.

In FIG. 1, a hatch 3 is hinged to pivot around a horizontal pivot axis 4 at the upper end of a hatch opening 1 of a car body 2. When a lock (not shown) is opened, the hatch 3 is moved by a gas spring 5 from the closed position into the open position shown. The gas spring 5 has a cylinder 6, in which a piston (not shown) is free to move back and forth. A piston rod 7 is attached to one end of the piston. The free end of the piston rod 7 is hinged to the hatch 3 a certain radial distance away from the pivot axis 4. The end of the cylinder 6 opposite the piston rod 7 is hinged to the car body 2, also a certain radial distance away from the pivot axis 4. Control lines 9 lead from an electric or electronic control unit 8 to the free end of the piston rod 7, whereas a sensor line 10 leads from an obstacle detection sensor 11 in the edge area of the hatch 3 opposite the pivot axis 4 to the control unit 8.

In the case of the gas springs shown in FIGS. 2-12, the piston 12 divides the interior space of the cylinder 6 into a first working chamber 14 and a second working chamber 15, sealing the two spaces off from each other, where the piston rod 7 extends through the second working chamber 15 and passes in a sealed manner to the outside through a guide and sealing unit 16. A piston chamber 13 is formed in the piston 12, and a valve channel 17 coaxial to the longitudinal axis of the cylinder 6 leads from the first working chamber 14 to the piston chamber 13. The piston chamber 13 is connected to the second working chamber 15 by a bore 27 in the sidewall piston 12.

The valve channel 17 extends through a pipe socket-like part 18, which projects into the piston chamber 13, where the end of the pipe socket-like part 18 facing the piston chamber 13 forms a valve seat 19 of an electrically actuated seat valve 20, designed as a solenoid-operated valve, onto which a plate-like closing element 21 of an elastic material can be set. A ferromagnetic magnet 22 is permanently connected coaxially to the closing element 21; the magnet is guided in the piston chamber 13 with the freedom to move back and forth coaxially to the longitudinal axis of the cylinder 6. The magnetic core 22 is acted upon by a pretensioned spring 23, designed as a helical compression spring. In FIGS. 2-9, the force of the spring acts in the direction which opens the valve seat 20, and in FIGS. 10-12 it acts in the direction which closes it.

Figure 2:
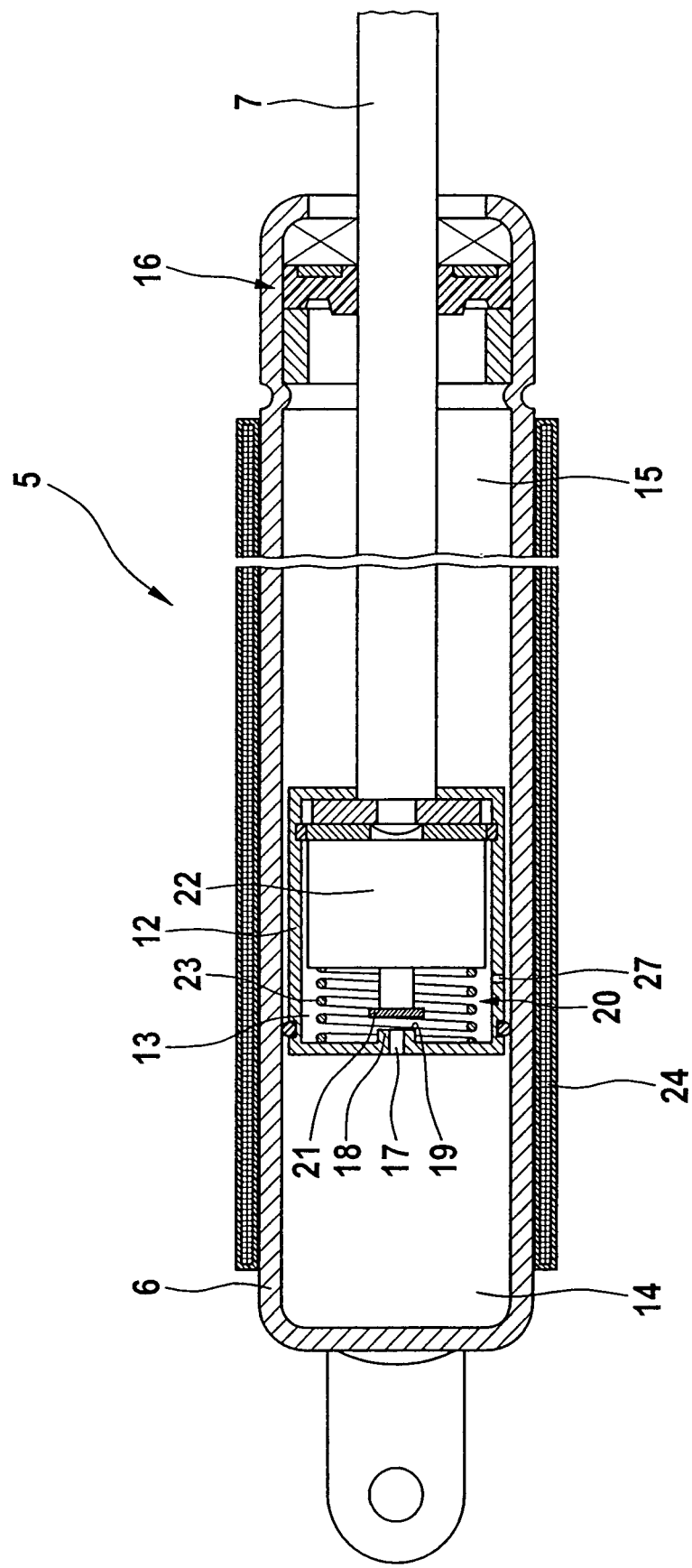
FIG. 2 shows a cross section of a first exemplary embodiment of a gas spring for a device for lifting a hatch.

In the exemplary embodiment of FIG. 2, a coil 24 surrounds the cylinder 6, which is made of high-grade steel or some other nonferromagnetic material. The coil covers the entire distance over which the piston can travel in the cylinder 6 and is permanently attached to the outer lateral surface of the cylinder 6. The coil 24 can be supplied with current by the control unit 8 via control lines 9 (not shown in FIG. 2).

Figure 3:
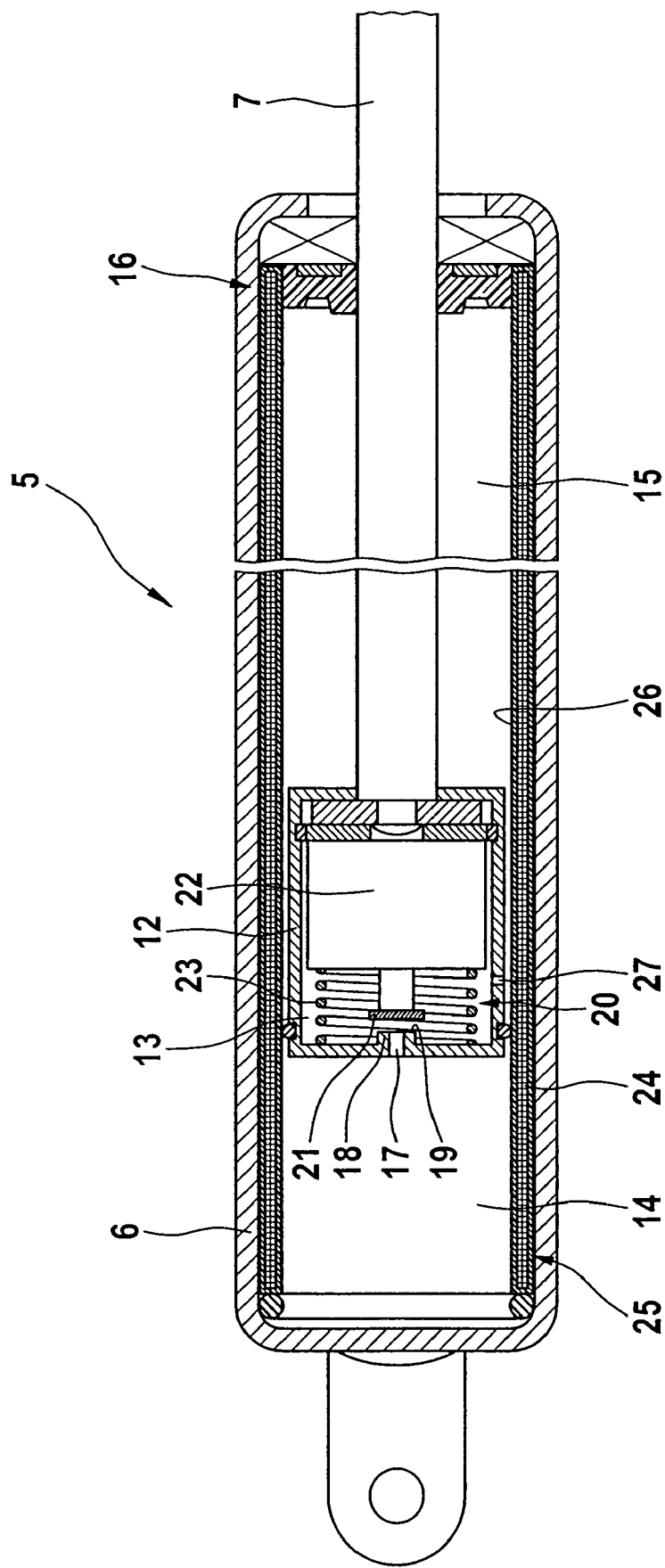
FIG. 3 shows a cross section of a second exemplary embodiment of a gas spring for a device for lifting a hatch.
Figure 4:
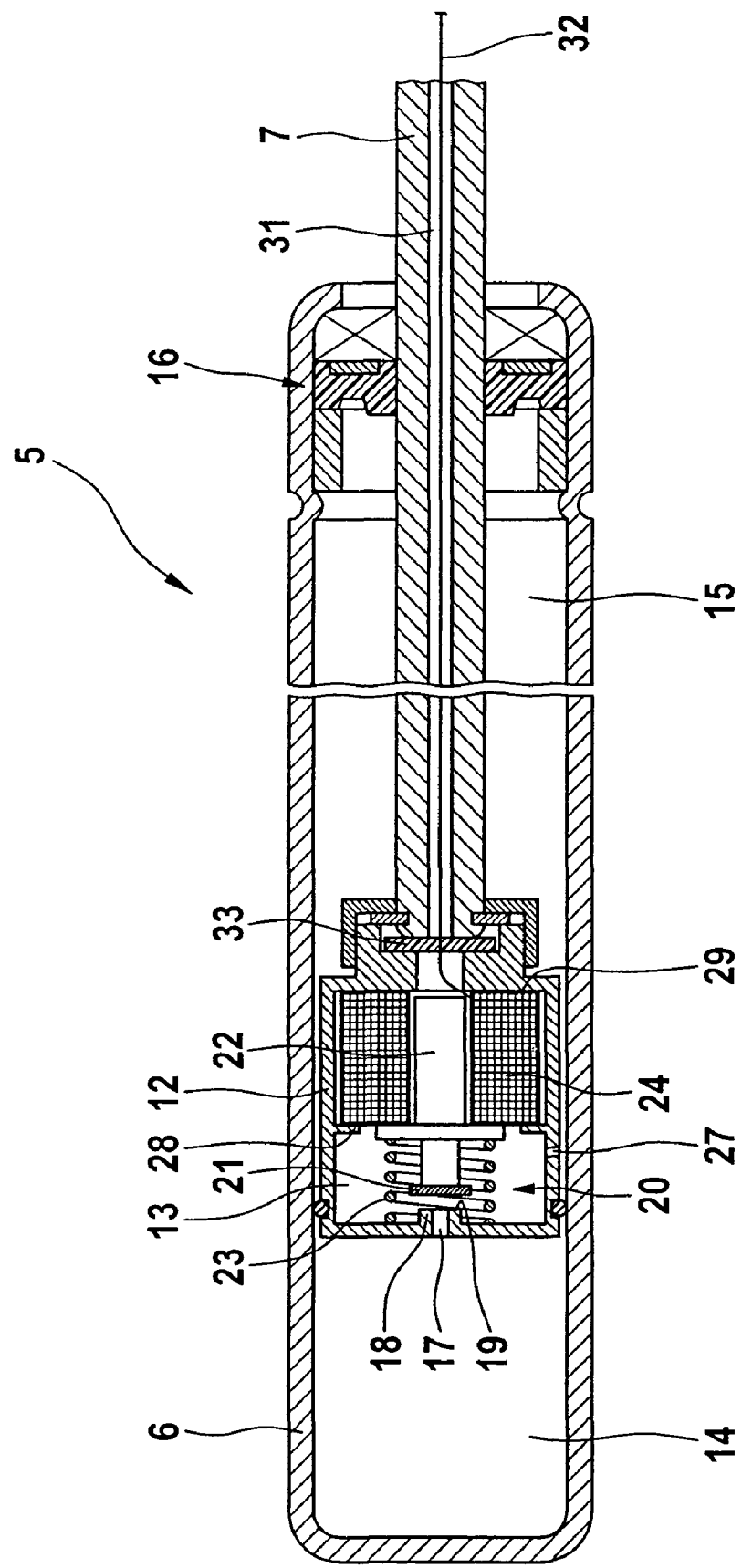
FIG. 4 shows a cross section of a third exemplary embodiment of a gas spring for a device for lifting a hatch.

In FIG. 3, a tube 25 of plastic is provided in the cylinder 6. This tube extends over the entire length of the cylinder 6, and its outer cylindrical lateral surface is in tight contact with the inside wall of the cylinder 6. The piston 12 is guided with freedom to move back and forth coaxially in the through-opening 26 of the tube 25 in a sealed manner. A coil 24 is injection-molded into the tube 25; this coil covers the entire distance over which the piston 12 can travel and can be supplied with current by the control unit 8 via control lines 9 (not shown in FIG. 3).

In the exemplary embodiments of FIGS. 4-12, the coil 24 is provided in the piston chamber 13. The coil 24 surrounds the magnetic core 22 with play.

In each case, the valve channel 17, the piston chamber 13, and the bore 27 form a through-channel connecting the first and second working chambers 14, 15.

In the exemplary embodiments of FIGS. 4-6 and 9-12, the coil 24, designed here as a coil block, is held axially in its installed position in the piston chamber 13 between the two shoulders 28 and 29 of the piston 12.

Figure 8:
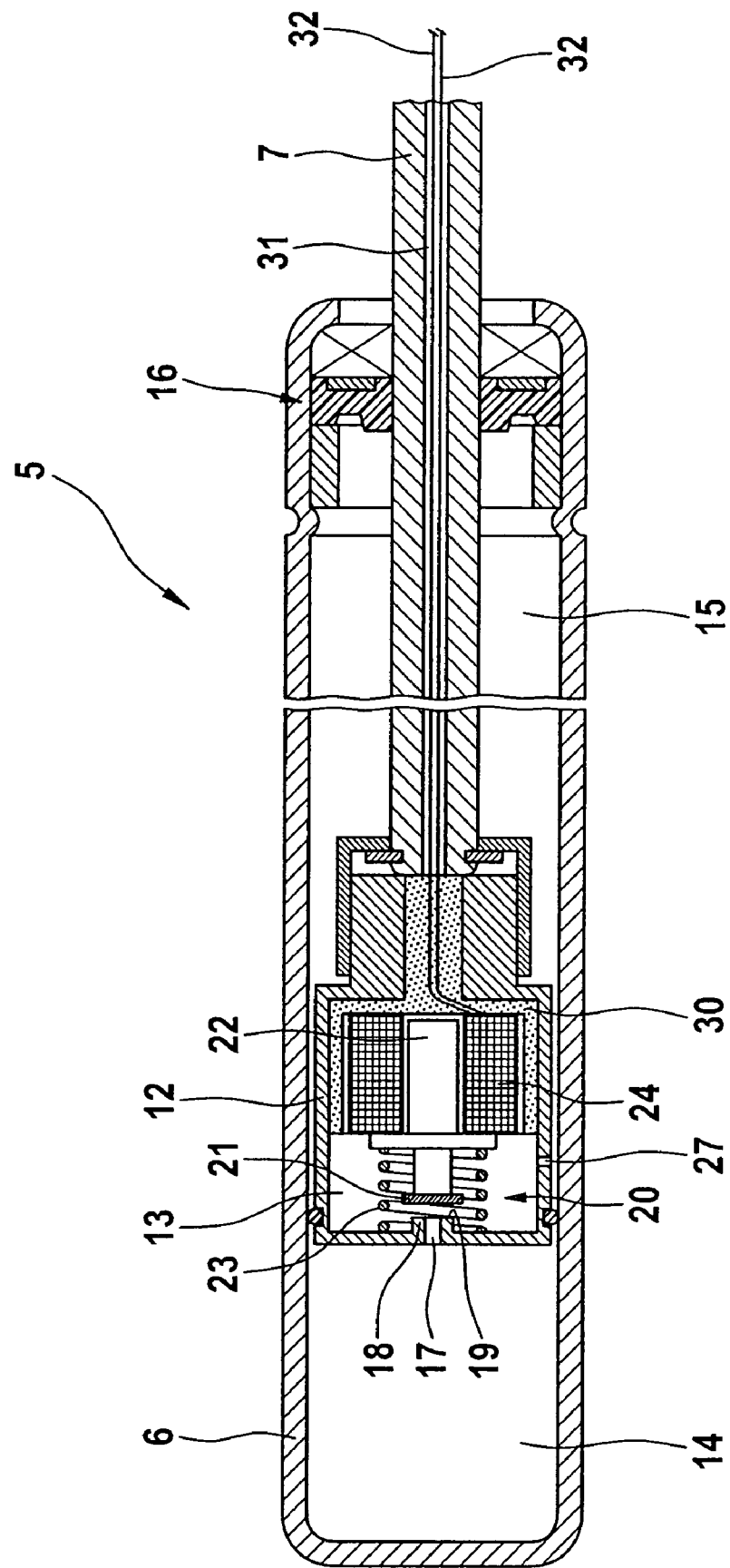
FIG. 8 shows a cross section of a sixth exemplary embodiment of a gas spring for a device for lifting a hatch.
Figure 9:
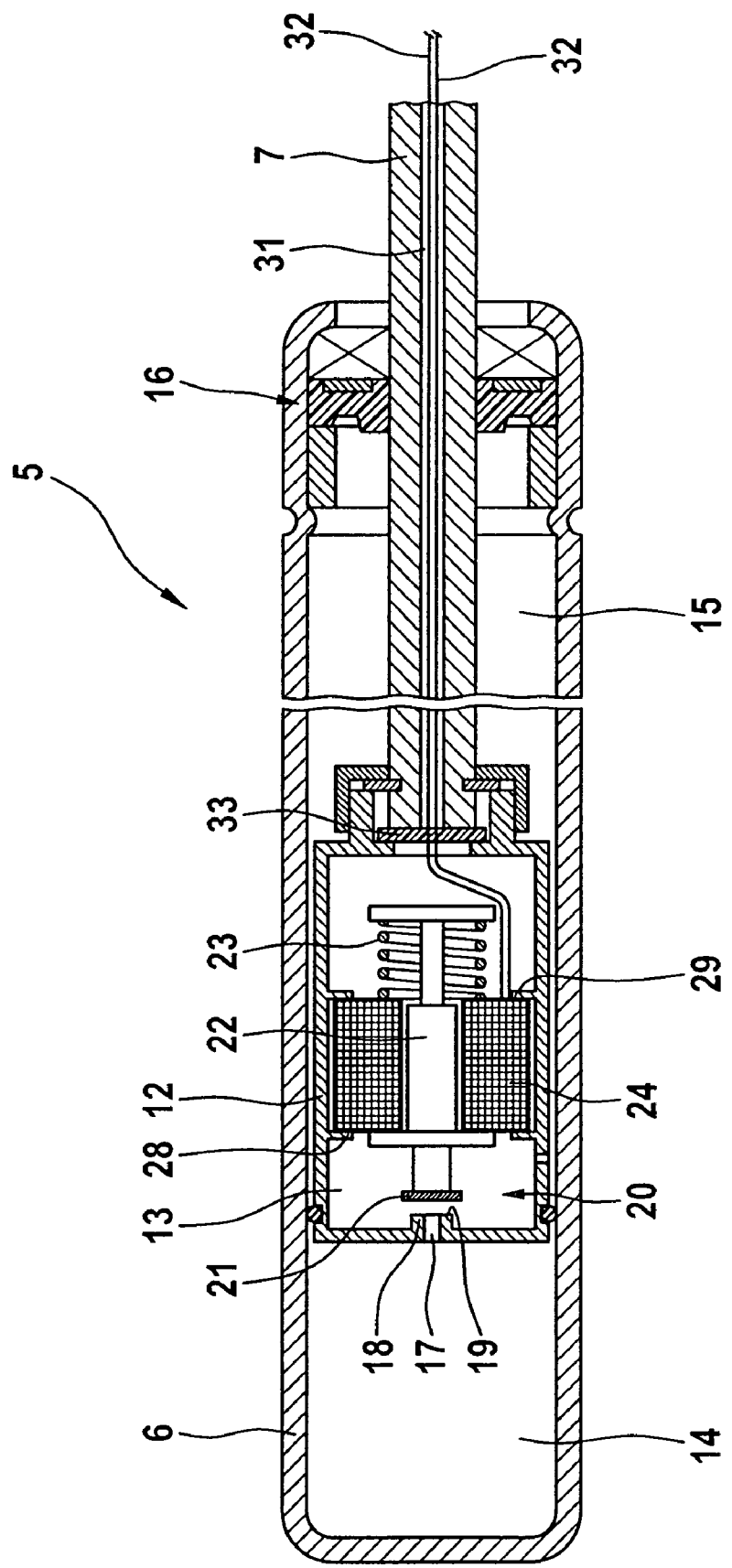
FIG. 9 shows a cross section of a seventh exemplary embodiment of a gas spring for a device for lifting a hatch.

In FIG. 8, the coil 24 is held in the piston chamber 13 by means of a plastic sealing compound 30.

In the exemplary embodiments of FIGS. 4-11, a continuous axial opening 31 is formed in the piston rod 7. The power lines 32 leading to the coil 24 pass through this opening. At the free end of the piston rod 7 (not shown), these power lines are connected electrically to the control lines 9, so that power can be supplied to the coil 24. The coaxial opening 31 is sealed off from the piston chamber 13.

In the exemplary embodiments of FIGS. 4 and 9-11, the power lines 32 are surrounded by a plate-like seal 33 of an elastomeric plastic, which has been injection-molded around them. The seal is clamped between the piston 12 and the end of the piston rod 7 facing the piston.

Figure 7:
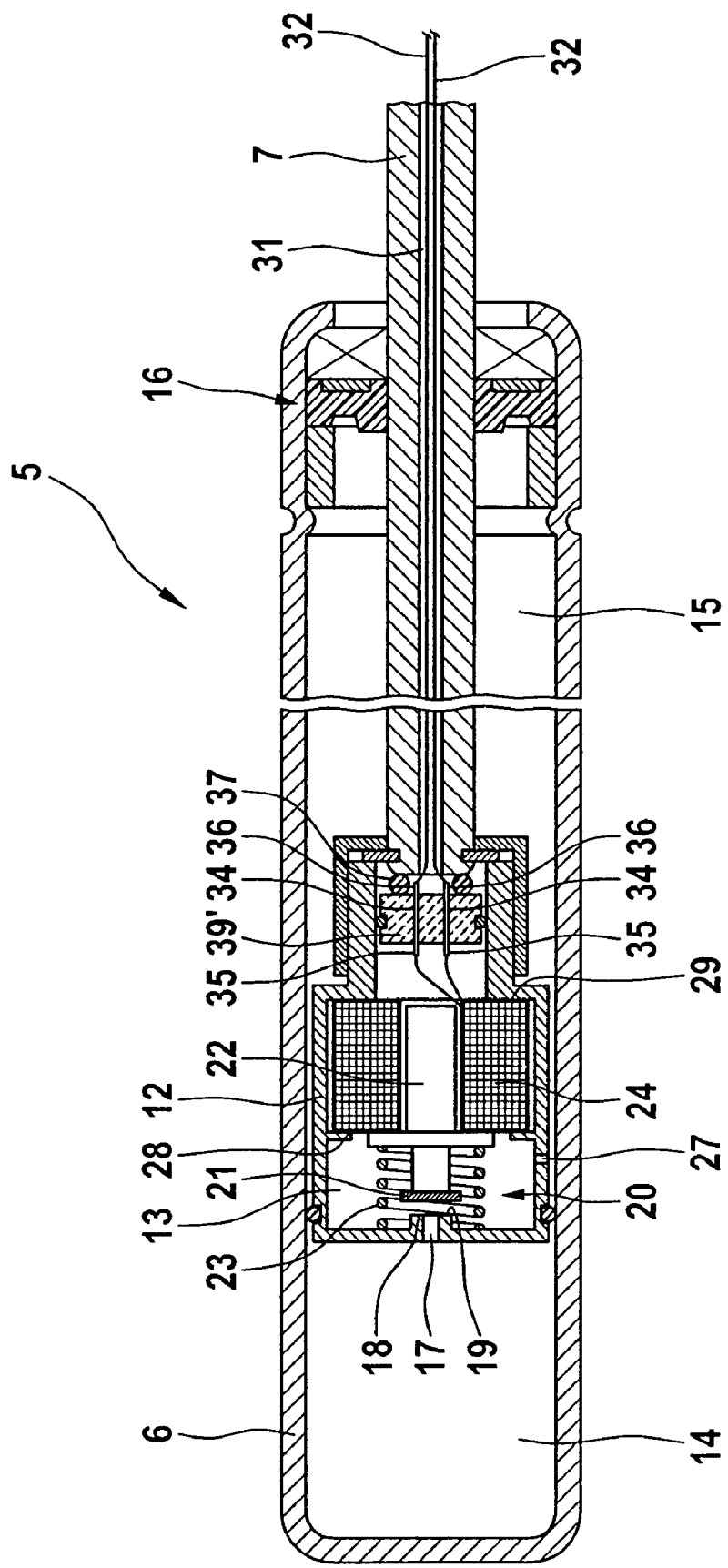
FIG. 7 shows a cross section of a fifth exemplary embodiment of a gas spring for a device for lifting a hatch.

In FIGS. 5-7, a dielectric sealing body 39, 39' is inserted tightly into the piston chamber 13 between the orifice of the coaxial opening 31 leading to the piston chamber 13 and the area of the coil 24. This sealing body has axial pass-through openings, through which the pass-through contacts 34 projecting axially from both sides are guided, the first ends 35 of which are connected electrically to the coil 24, the second ends 36 to the power lines 32. The sealing body 39, 39' rests axially against the end of the piston rod 7 facing the piston chamber 13 by way of a seal 37.

In the exemplary embodiment of FIGS. 5 and 6, the pass-through contacts 34 are surrounded by sealing rings 38, which are mounted in the dielectric sealing body 39 and which seal off the pass-through contacts 34 in the sealing body 39.

In the embodiment of FIG. 7, the sealing body 39' is a glass sealing body, in which the pass-through contacts 34 are embedded.

In the exemplary embodiment of FIG. 8, the area between the orifice of the coaxial opening 38 leading to the piston chamber 13 and the coil 24 is filled by the sealing compound 30, through which the power lines 32 pass.

Figure 10:
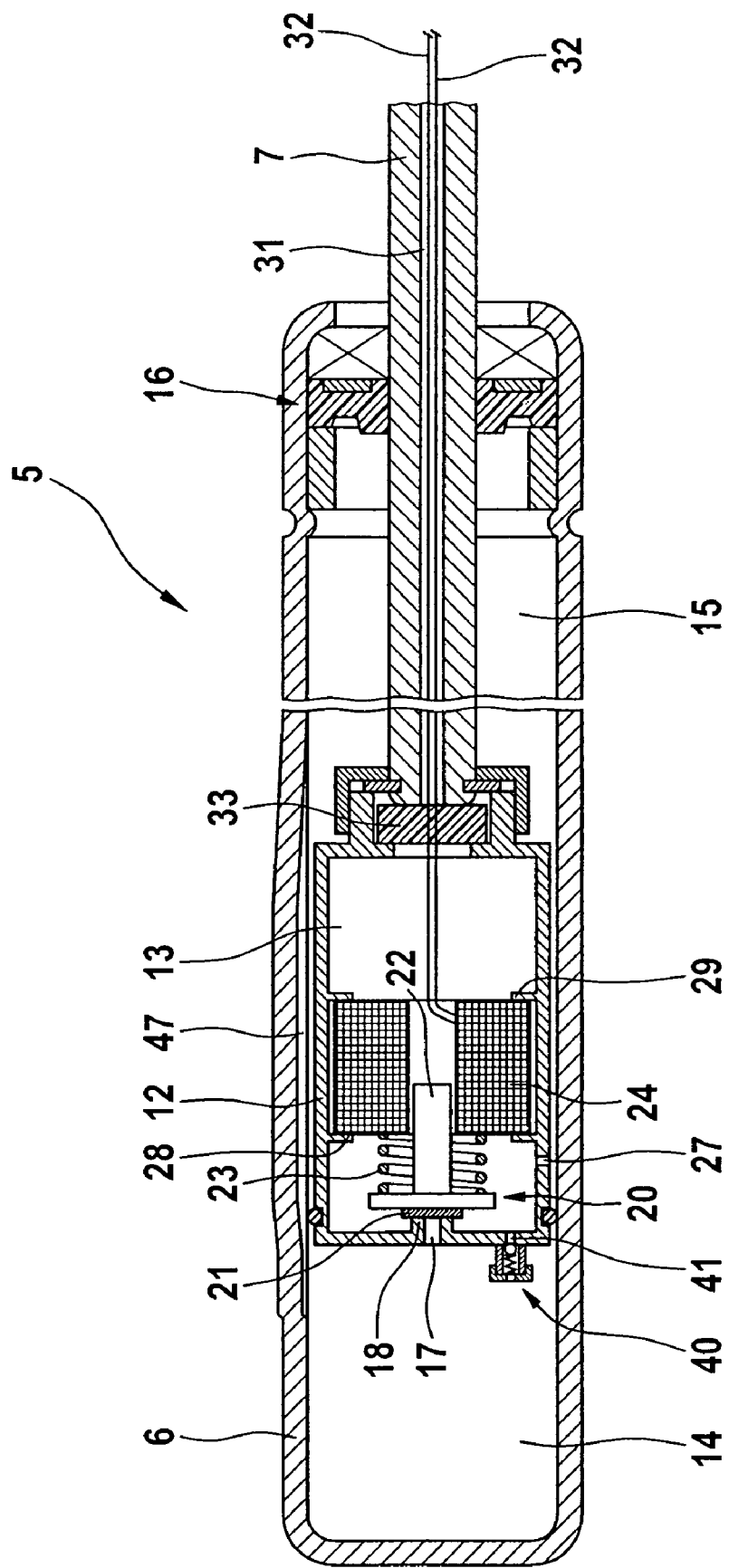
FIG. 10 shows a cross section of an eighth exemplary embodiment of a gas spring for a device for lifting a hatch in the closed position of the valve.
Figure 11:
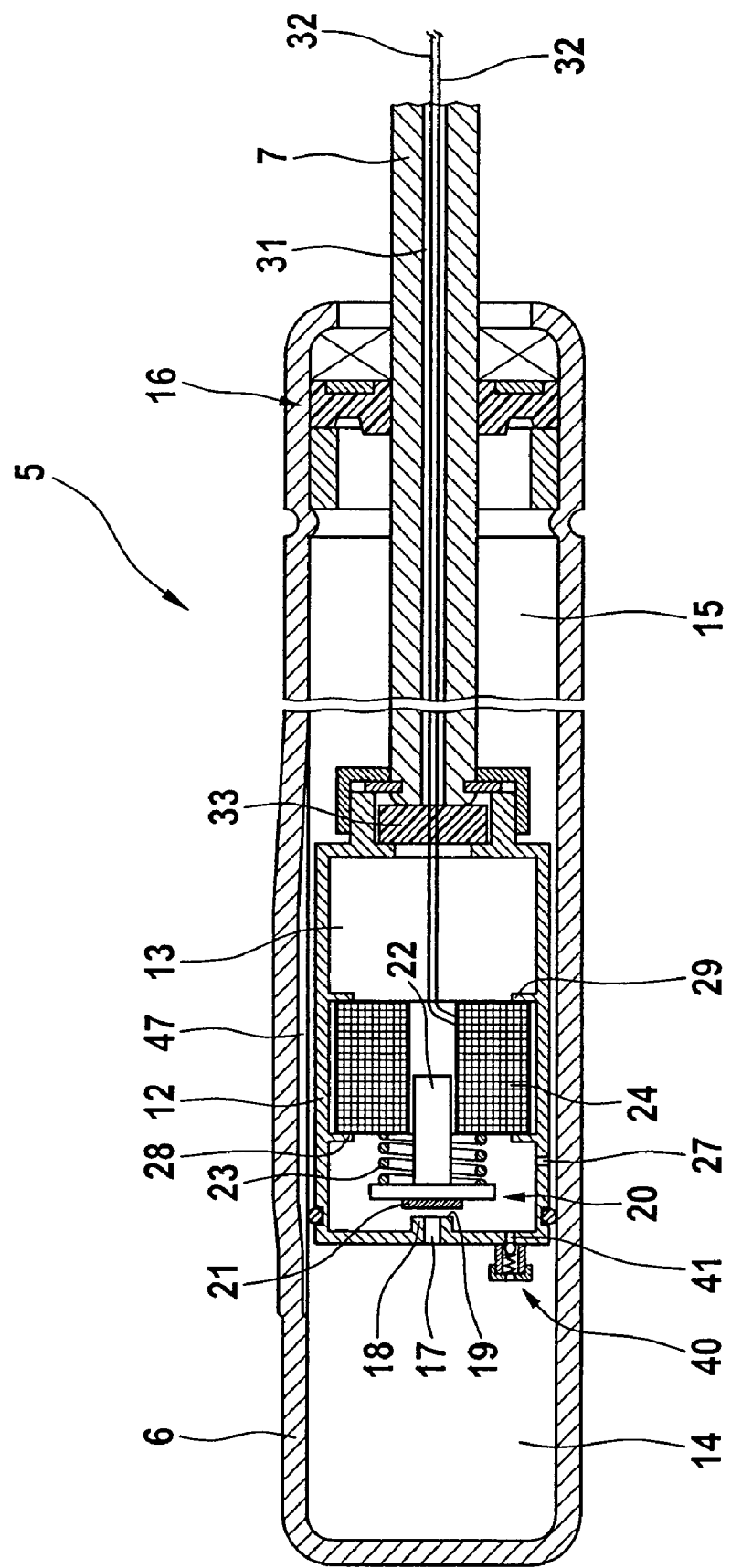
FIG. 11 shows a cross section of the gas spring according to FIG. 10 in the open position of the valve.

In the exemplary embodiments of FIGS. 10 and 11, a check valve 40 pretensioned in the closing direction is provided in the piston 12. This valve makes it possible for a connection 41 to be opened from the second working chamber 15 to the first working chamber 14 when, through manual actuation of the hatch 3 in the opening direction, the pressure in the second working chamber 15 increases versus the pressure in the first working chamber 14.

Figure 12:
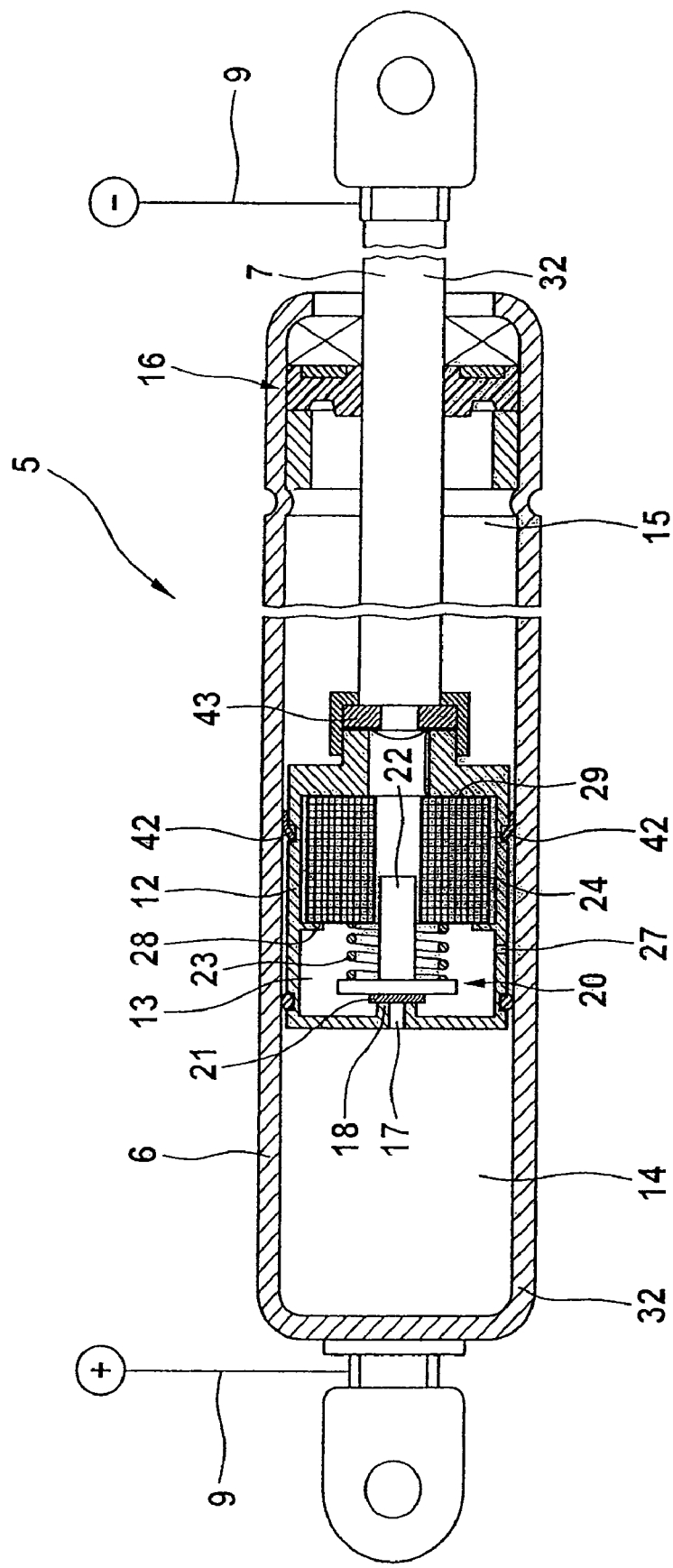
FIG. 12 shows a cross section of a ninth exemplary embodiment of a gas spring for a device for lifting a hatch in the closed position of the valve.
Figure 14:
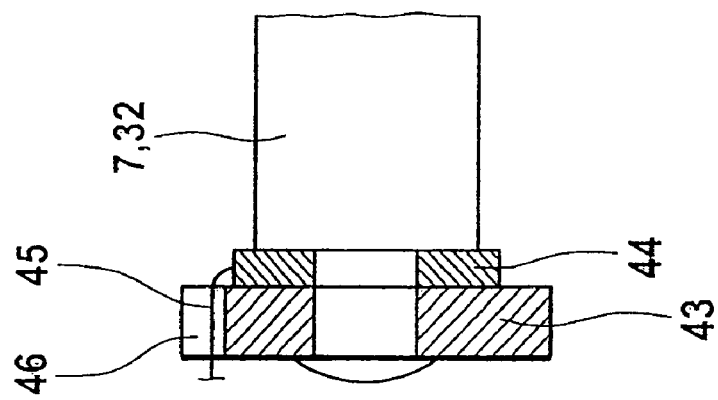
FIG. 14 shows a cross section of a third possibility for making electric contact with the coil in a gas spring according to FIG. 12.
Figure 13:
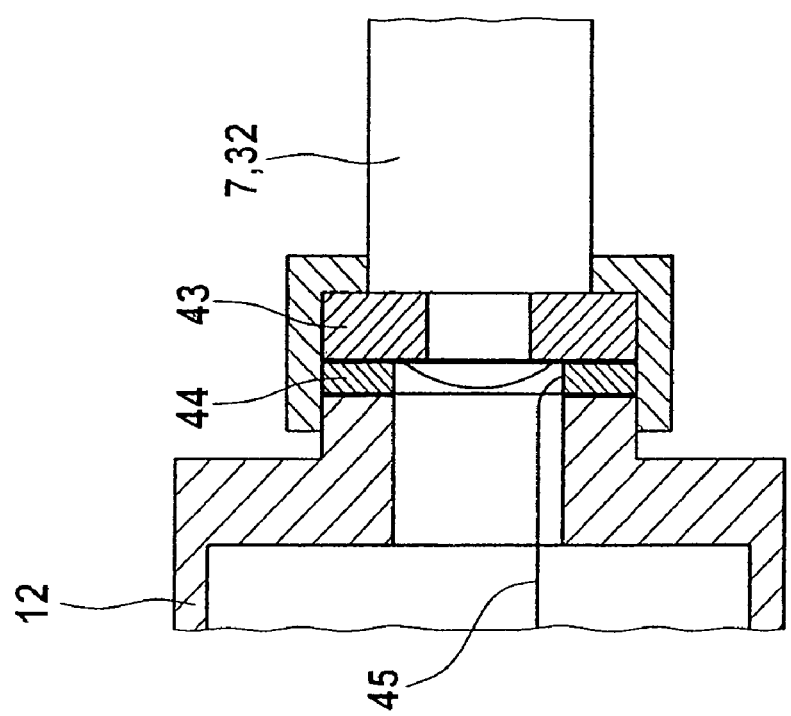
FIG. 13 shows a cross section of a second possibility for making electric contact with the coil of a gas spring according to FIG. 12.

In the exemplary embodiments of FIGS. 12-14, the electrically conductive piston rod 7 forms the one power line 32, and the cylinder 6, made of an electrically conductive material, forms the other power line 32. Projecting, radially elastic slide contacts 42 are mounted on the cylindrical lateral surface of the piston 12. These contacts rest against the inside wall of the cylinder 6 and are electrically connected to the coil 24, thus establishing a conductive connection between the cylinder 6 and the coil 24.

A conductive support disk 43, which is insulated from the piston 12, is riveted to the end of the piston rod 7. A contact disk 44, from which a conductor 45 leads to the coil 24, is in contact with this support disk.

Figure 15:
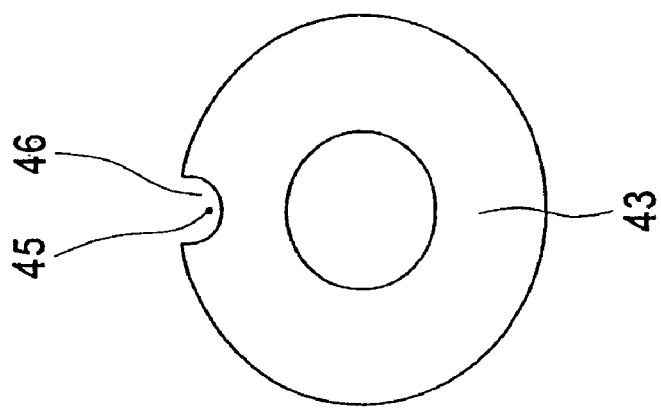
FIG. 15 shows an end view of the design according to FIG. 14.

The contact disk 44 can be clamped (FIG. 13) between the piston 12 and the support disk 43, or it can be riveted together with the support disk 43 to the piston rod 7 (FIGS. 14 and 15), where the support disk 43 has a pass-through groove 46 for the conductor 45 at its edge.

If, during the process of opening the hatch 3, an obstacle in the pivot range of the hatch 3 is detected by the obstacle detection sensor 11, which can occur in the case of a low garage roof, for example, a corresponding signal is sent to the control unit 8 from the obstacle detection sensor 11. The control unit sends power via the control lines 9 and the power lines 32 to the coil 24 or cuts off the power to the coil 24, so that the seat valve 20 closes the valve channel 17.

As a result, the opening movement of the hatch 3 is stopped, and there is no collision with the obstacle.

This stopping of the opening movement is not possible in the case of the exemplary embodiment of FIGS. 10 and 11 in the area in which an axial groove 47, extending over a certain part of the longitudinal extent of the cylinder 6, is formed in the inside wall of the cylinder 6, because this axial groove 47 forms an always-open bypass to the valve channel 17.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for lifting a hatch which can pivot with respect to a stationary component around a pivot axis by means of a piston-cylinder unit, the piston cylinder unit comprising:
   a closed cylinder filled with a fluid, the cylinder having opposite ends, one of said ends being hinged to one of said hatch and said stationary component;
   a piston dividing said cylinder into first and second working chambers, the piston being axially movable in the cylinder, the piston having a piston chamber configured as a through-channel leading from the first working chamber to the second working chamber, a first input into the piston chamber arranged on a face of the piston facing the first working chamber, a valve seat arranged at an end of the first input in the piston chamber, a closing element arranged in the piston chamber configured to mate with the valve seat, and at least one biasing element arranged within the through-channel configured to bias the closing element;
   a piston rod having a coaxial bore, being fixed to the piston and passing through the second working chamber, the piston rod being guided through a first seal at one end of the cylinder and being hinged to the other of said hatch and said stationary component; and
   a solenoid-operated valve which can open and close the through-channel in the piston comprising a closing element which is biased toward one of an open and a closed position by the at least one biasing element configured as a spring, said valve being electrically actuated to move the closing element toward the other of the open and closed position;
   the solenoid-operated valve comprising a ferromagnetic core movably supported in the piston chamber and a coil mounted in the piston chamber, the coil surrounding the ferromagnetic core and extending axially with respect to a path of movement of the core;
   power lines extending through the coaxial bore and connecting to the coil; and
   a second seal comprising a plastic sealing compound filling an area in the piston between the coaxial bore and the piston chamber and surrounding the coil, the second seal sealing the piston chamber from the coaxial bore and holding the coil in the piston chamber, the power lines connecting to the coil through the plastic sealing compound.

2. The apparatus of claim 1, the second seal filling at least a portion of the piston chamber between the biasing element and the piston rod.

3. The apparatus of claim 1 wherein the through-channel comprises a valve channel connecting the first working chamber to the piston chamber, the closing element closing the valve channel, the piston chamber being connected to the second working chamber.

4. The apparatus of claim 3 wherein the piston comprises a socket-like part projecting into the piston chamber and surrounding the valve channel, the socket-like part forming the valve seat for the closing element.

5. The apparatus of claim 1 further comprising a one-way flow connection between the first and second working chambers, the one-way flow connecting having a check valve which is biased in the closing direction, whereby fluid can flow from the second working chamber to the first working chamber through the check valve.

6. The apparatus of claim 1 wherein the cylinder has an inside wall provided with at least one axial groove which acts as a fluid bypass around said piston in a limited range of movement of said piston in said cylinder.

7. The apparatus of claim 1 further comprising a control unit which can actuate said solenoid-operated valve as a function of at least one of permanently stored data and variable input data.

8. The apparatus of claim 7 further comprising an obstacle detection sensor for monitoring an area in the immediate vicinity of the hatch, the obstacle detection sensor generating a detection signal which is transmitted to the control unit, the control unit generating said variable input data based on said detection signal.

9. The apparatus of claim 8 wherein the obstacle detection sensor is one of a camera, a contact sensor, and a proximity sensor.

* * * * *